June 21, 1938. D. E. WEBSTER 2,121,751
CUTTING-OFF WHEEL
Filed March 30, 1937

Inventor
Duane E. Webster

Witness
Robert G. Trumbull

By Clayton L. Jenks
Attorney

Patented June 21, 1938

2,121,751

UNITED STATES PATENT OFFICE 2,121,751

CUTTING-OFF WHEEL

Duane E. Webster, Worcester, Mass., assignor to Norton Company, Worcester, Mass., a corporation of Massachusetts Application March 30, 1937, Serial No. 133,847

1 Claim. (Cl. 51—280)

This invention relates to cutting off abrasive wheels, and more particularly to cutting off wheels of extreme thinness which are required for severe cutting operations.

It is desirable for the purpose of cutting tungsten metal rods and for slitting fountain pen points made of extremely hard metals, such as an alloy of iridium and osmium, that the abrasive wheel be extremely thin and yet strong enough for the operation. In such cutting operations, it is customary to run the wheel between guide members made of diamond or boron carbide which serve to hold the wheel straight just at the point where it goes into the article to be cut. If the cutting off wheel has harsh abrading characteristics on its sides, then this tends to wear the guides and thus to defeat their purpose. Moreover, owing to the fragile character of the wheel they tend to break rather frequently with a possible danger to the operator as well as the economic expense involved.

It is the primary object of this invention to provide a cutting off wheel which is so constituted that it has substantially non-abrasive sides and is strong and resistant to lateral stresses and so will give a long life of useful service. Other objects will be apparent in the following disclosure.

A satisfactory type of cutting off wheel is made of abrasive grains bonded by vulcanized rubber. Such a wheel may be less than 0.025 inch thickness and ordinarily as thin as 0.010 to 0.006 inch in thickness. In accordance with this invention, I propose to strengthen and to improve that type of cutting off wheel by providing its side faces with a coating of a resinoid which has been hardened to an infusible and insoluble condition. The preferred type of resinoid for this purpose is a phenolic formaldehyde resinoid, and this is preferably applied to the opposite sides of the cutting-off wheel prior to the step of vulcanizing the rubber bond thereof so that the resinoid may be brought to its final solid infusible condition simultaneously with the vulcanization of the rubber.

Figure 1:
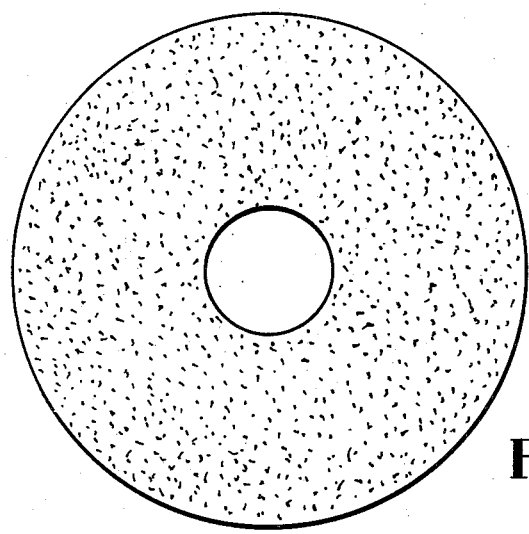
Figure 2:
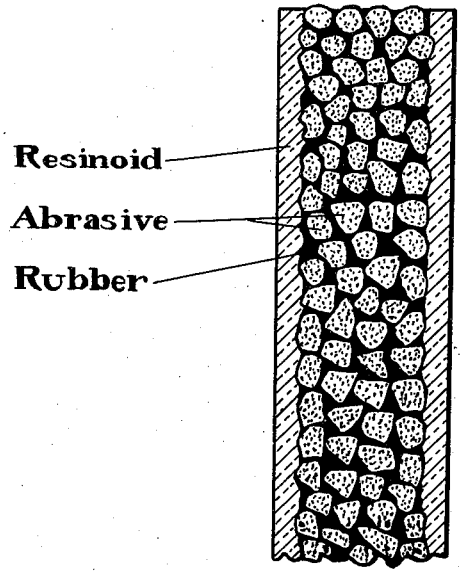

In order that the invention may be more fully understood reference is to be had to the accompanying drawing in which Fig. 1 is a plan view of the cutting off wheel; and Fig. 2 is a section, greatly enlarged, showing diagrammatically the general arrangement of the wheel structure and its resinoid sides.

This cutting off wheel may be made of a suitable granular abrasive material, such as crystalline alumina, boron carbide or silicon carbide, bonded by means of vulcanized rubber in accordance with suitable procedure. One preferred method of compounding the abrasive and the rubber and shaping the same to a desired thickness involves the steps of mixing a mass of crude rubber intimately with the abrasive material as well as with sulfur and a vulcanization accelerator by passing the crude rubber repeatedly between heated rolls, and repeatedly folding the mass between the rolling operations so as to enfold a quantity of abrasive grains, sulfur, etc., whereby the rolls force the granular material into intimate association with the rubber and thus form a body in which the abrasive grains are substantially uniformly distributed.

The abrasive grains may be of suitable size, such as grains which will just pass through a screen of 90 meshes to the linear inch, and the ingredients may be proportioned to make a desired grade and structure, such as Grade R on the Norton grade of hardness and a zero structure, or the minimum of porosity. Other grades and structures may of course be made and used. The abrasive will be mixed with the rubber in desired quantities, such as 75% of abrasive and 25% of bond, and whereof the sulfur comprises 35% of the rubber bond mixture.

After the sulfur, accelerator and abrasive grains have been incorporated in the rubber body, then the mass, which has been rolled into the form of a thick sheet, is passed between calendering rolls which serve to roll the rubber and abrasive mass to a sheet of the required thickness for the cutting off wheel. It is preferred at this time to place the resinoid layers on the opposite sides of the rubber sheet, and various procedures may be adopted for the purpose.

The coating of resinoid is preferably applied by dipping the thin rubber sheet in a trough containing the resinoid as a powder in the unconverted B stage condition. The rubber sheet may have the power sprinkled on opposite sides thereof; or it may be coated by dipping it first one side and then the other in the resinoid powder. Then the sheet is again passed through the calendering roll to force the resinoid into intimate contact with the rubber mass. Thereafter, the sheet may be again dipped in the powder for a further coating and again passed through the rolls. It is preferred, at the stage of adding the powder, that the sheet have nearly its final thickness, so that this particular step of the process serves chiefly for making a complete coating of the powder on each side of the rubber and abrasive mass. The coating powder is preferably a very finely ground material, such as 240 or finer grit size, so that the powder will be in such a size and condition that it will readily adhere to the rubber body, and it may readily flow to form a film during the vulcanizing and hardening operation.

After the rubber sheet has been thus coated on its opposite sides with the resinoid, it may then be cut to the desired shapes for making the cutting off wheels, and the latter will be then subjected to a heat treatment for vulcanizing the rubber and hardening the resinoid. Various types of procedure may be adopted for this purpose but it is suitable to place the thin rubber abrasive disk in a vulcanization oven, while maintained either in a mold or outside of the same, and heat it to a temperature of about 350° F. for a sufficient time to insure a satisfactory vulcanization of the rubber. This temperature is high enough to cause the resinoid grains to become first fluid and then to form a film over the rubber surface after which it hardens to the final infusible and insoluble condition.

This resinoid film looks a good deal like a coating of varnish, and it serves to penetrate such pores as may be present and to form a substantially continuous layer over the entire surface of each side of the rubber and abrasive disk. It thereby coats the grains as well as the rubber on the sides of the wheel and thus forms a wheel which has its sides composed almost exclusively of the resinoid material. Consequently this body when run between the guides in a cutting off operation will not seriously abrade them. Moreover, the resinoid is a very strong substance as compared with the rubber and it adds materially to the strength of the rubber body, so that the cutting off wheel has a far longer life than would be possible if the body were made solely of the rubber and abrasive without the resinoid coating.

It will be appreciated that various modifications may be made in the method of making this wheel. One may coat the sides of the rubber wheel before or after vulcanization, by spraying a coating of a liquid resinoid thereon and allowing it to dry sufficiently between times so that it may be readily handled. Also a film of resinoid powder mixed with a solvent of various types, such as the liquid resinoid itself may be employed. It is, however, preferred to use the resinoid in a powdered form owing to the fact that the body may be handled without delays and the coating will not be disrupted during the processes of manufacture. Likewise, the coating may be placed on the wheels after they have been cut to their final form or even after the rubber has been vulcanized, although it is preferred to adopt the procedure as above outlined for the sake of simplicity and economy of operation.

In this way I make a wheel which is thinner than 0.025 inch and ordinarily as thin as 0.005 to 0.010 inch in thickness. Such a wheel may be four inches in diameter and have a hole of one inch diameter. The resinoid coating may be less than 0.001 inch thick. The wheel is very fragile because of its extreme thinness, but because of the resinoid coating the strength of this vulcanized rubber bond is materially increased. It may also be noted that it is desirable to use a resinoid which is insoluble and infusible after it has been set by heat. Hence, the resinoids of the type of the "Bakelite" phenolic formaldehyde condensation product that are standard on the market are particularly suitable for this purpose.

I claim:

A cutting off wheel comprising a body of abrasive grains bonded by hard vulcanized rubber and having a thickness not greater than 0.025 inch and wherein the abrasive and rubber on each side of the wheel is substantially completely coated with a thin film of an infusible insoluble resinoid which strengthens the wheel and provides non-abrasive sides.

DUANE E. WEBSTER.